(12) United States Patent
Gardin et al.

(10) Patent No.: US 6,505,992 B1
(45) Date of Patent: Jan. 14, 2003

(54) DEVICE FOR FLATLY DISPLACING IN ALL DIRECTIONS A SUPPORT, WITH QUICK LOCKING MEANS

(76) Inventors: Giancarlo Gardin, Via Castelfidardo, 10, 20122 Milano (IT); Massimo Benatti, Via A. Dezza, 41, 20144 Milano (IT)

( * ) Notice: Subject to any disclaimer, the term of this patent is extended or adjusted under 35 U.S.C. 154(b) by 0 days.

(21) Appl. No.: 09/581,405
(22) PCT Filed: Nov. 26, 1998
(86) PCT No.: PCT/IT98/00340
§ 371 (c)(1),
(2), (4) Date: Oct. 27, 2000
(87) PCT Pub. No.: WO99/31549
PCT Pub. Date: Jun. 24, 1999

(30) Foreign Application Priority Data

Dec. 16, 1997  (IT) .......................................... MI97A2781

(51) Int. Cl.⁷ ................................................ F16B 21/00
(52) U.S. Cl. .............................. 403/322.4; 403/322.1; 403/322.2; 359/827
(58) Field of Search ................................. 359/813, 827; 403/322.4, 321, 322.2

(56) References Cited

U.S. PATENT DOCUMENTS

| | | | | |
|---|---|---|---|---|
| 3,359,849 A | * | 12/1967 | Friedman ................ | 359/813 X |
| 3,463,019 A | * | 8/1969 | Noe ....................... | 359/813 X |
| 4,077,722 A | * | 3/1978 | Bicskei ................... | 359/813 X |
| 4,437,730 A | * | 3/1984 | Pickett ................... | 359/813 X |
| 5,194,993 A | * | 3/1993 | Bedzyk ................... | 359/813 |

FOREIGN PATENT DOCUMENTS

| | | | |
|---|---|---|---|
| DE | 2855496 A1 | * | 7/1980 |
| DE | 3436886 A1 | * | 4/1986 |
| EP | 392385 A2 | * | 4/1990 |

* cited by examiner

Primary Examiner—Lynne H. Browne
Assistant Examiner—Aaron M Dunwoody
(74) Attorney, Agent, or Firm—Hedman & Costigan, P.C.

(57) ABSTRACT

The present invention relates to a device for flatly displacing in all directions a support, with quick locking means, the main feature of which is that it comprises a flat support housed in a casing, delimiting the displacement region of said flat support. On the flat support a locking body operatively associated with a locking driving element which can be accessed from the outside of the casing is overlapped.

4 Claims, 6 Drawing Sheets

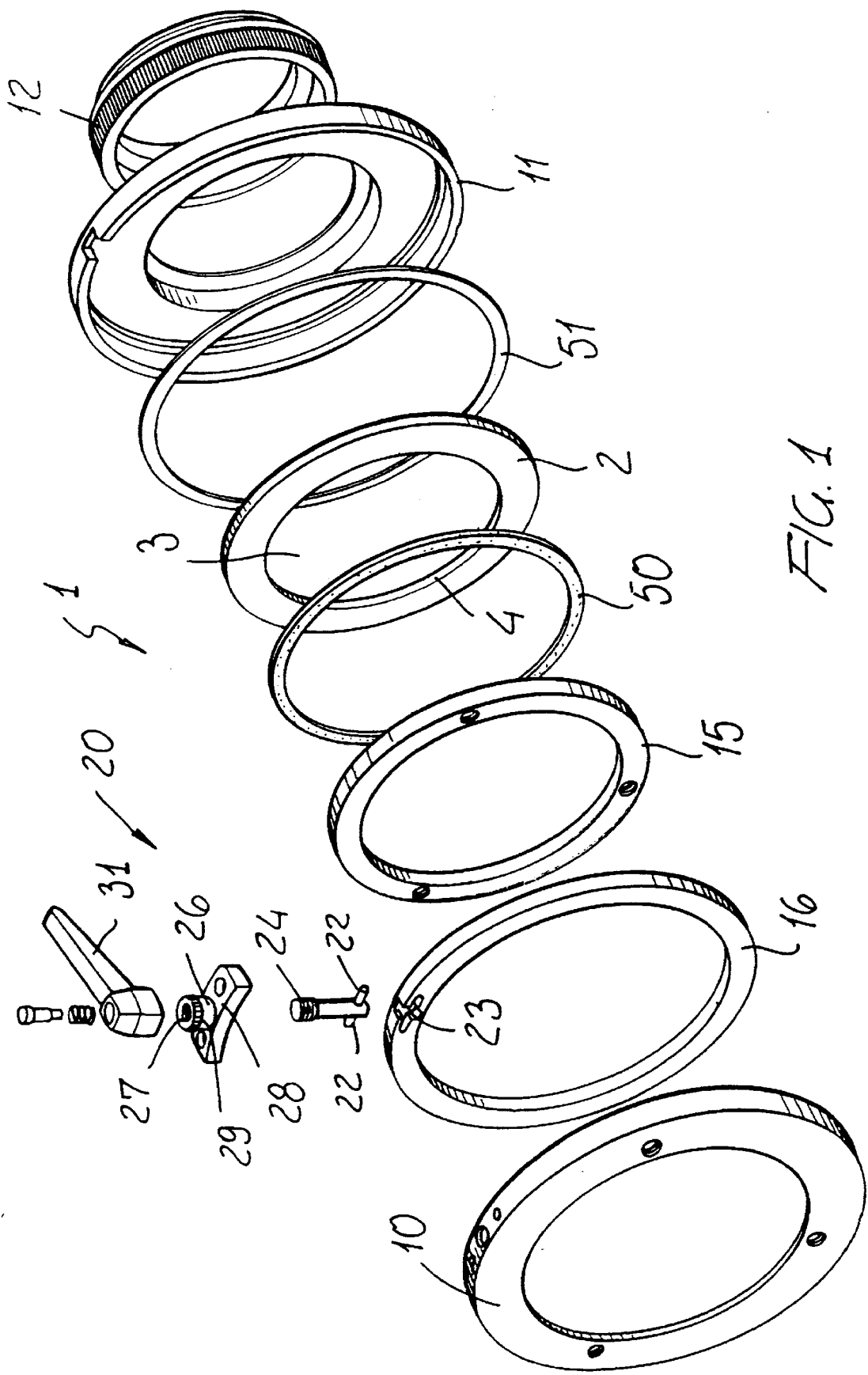

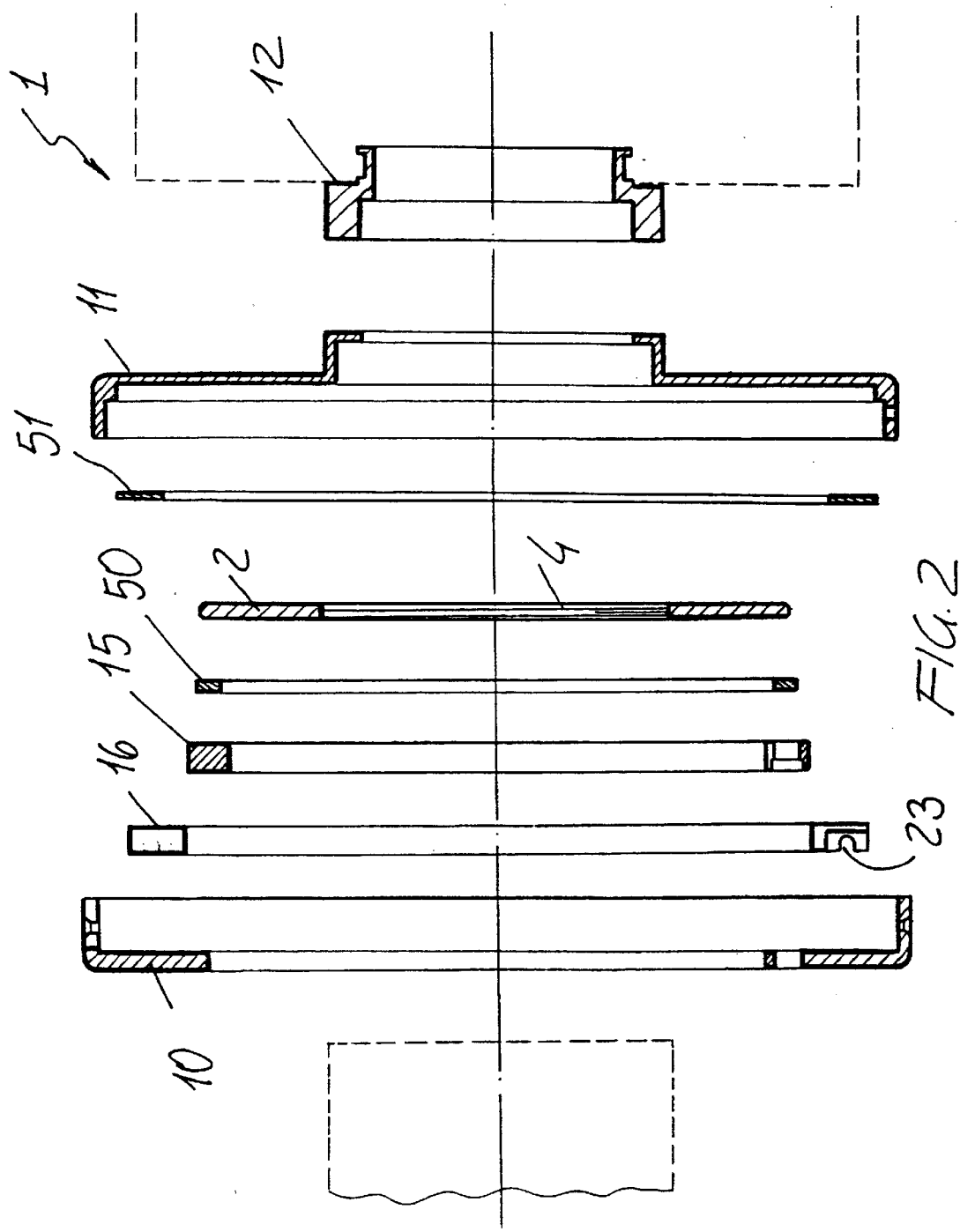

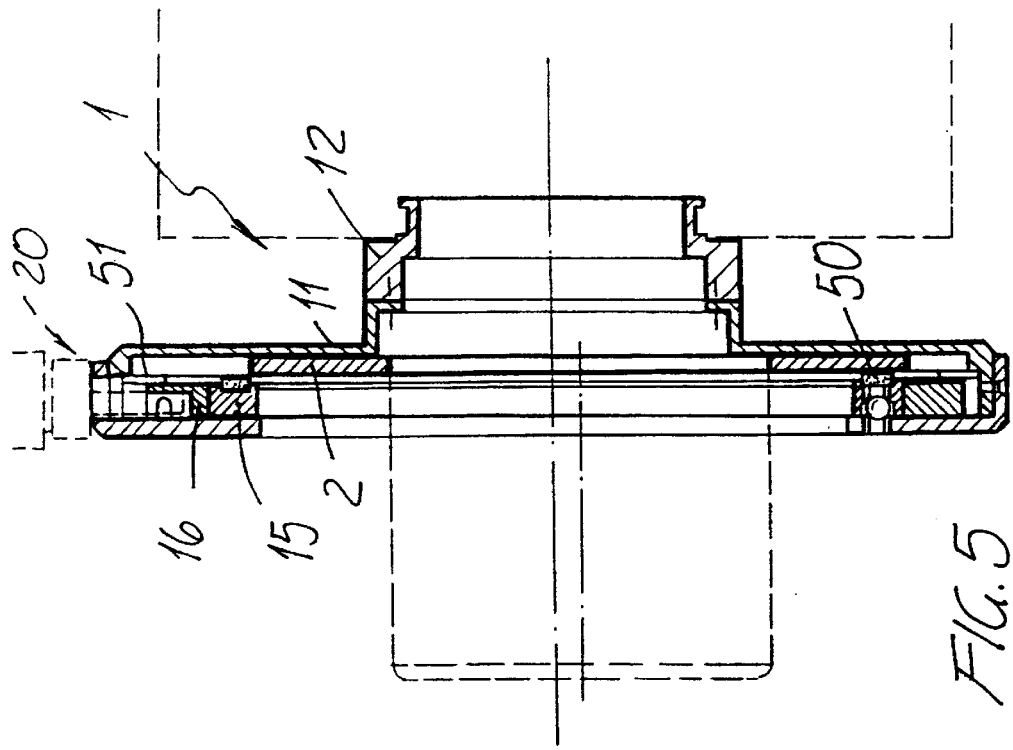
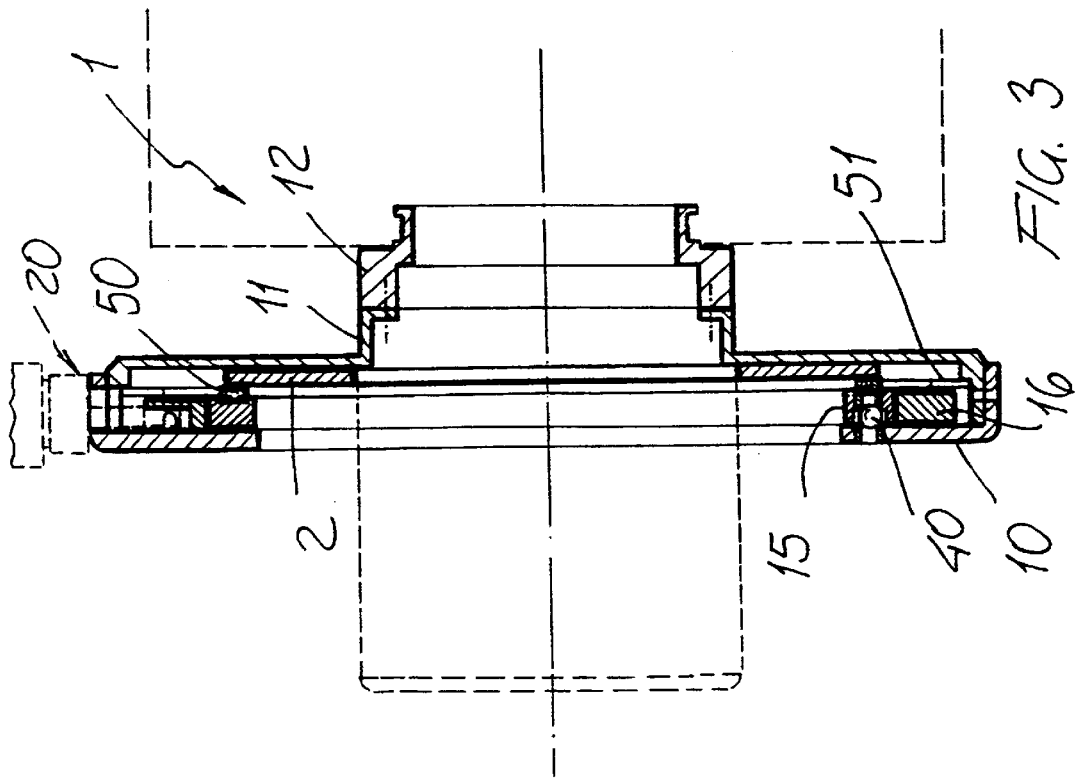

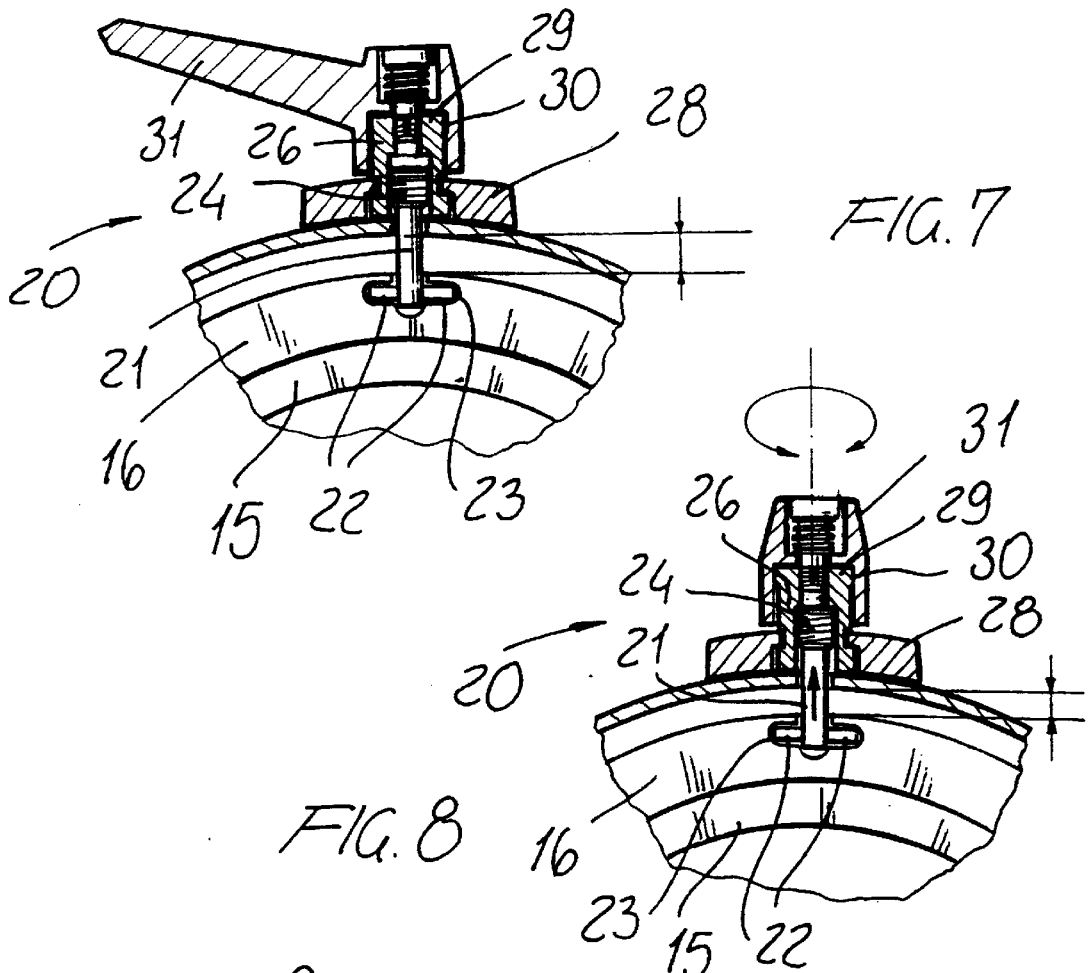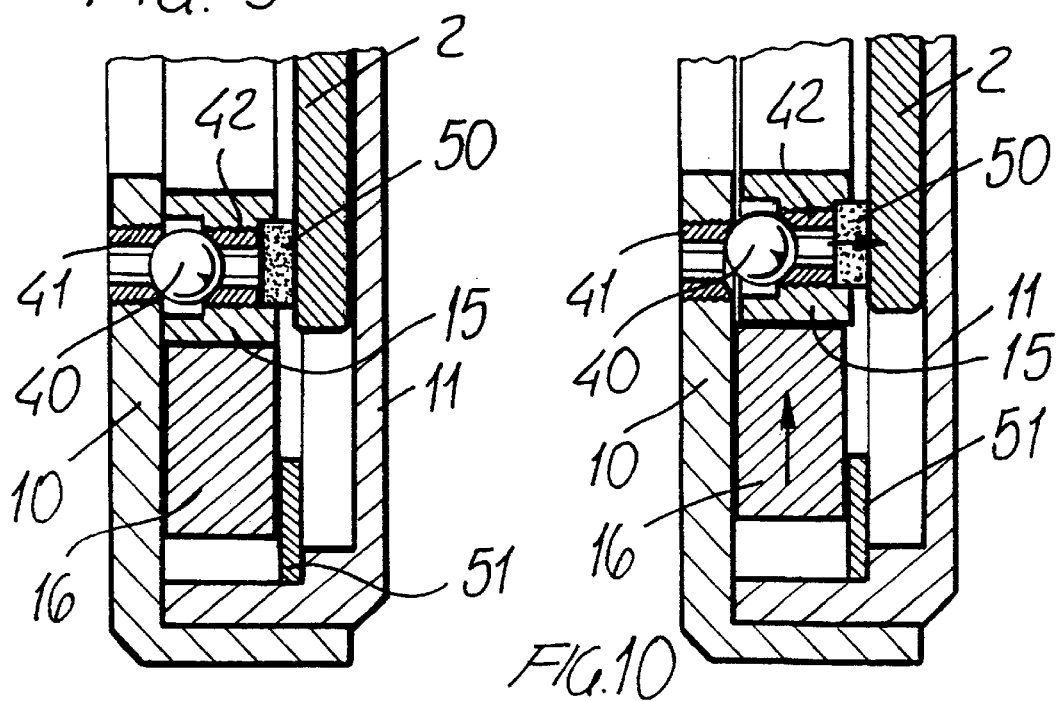

DEVICE FOR FLATLY DISPLACING IN ALL DIRECTIONS A SUPPORT, WITH QUICK LOCKING MEANS

BACKGROUND OF THE INVENTION

The present invention relates to a device for flatly displacing, in all directions, a support, with quick locking means.

As is known, in order to allow a restraining support to be displaced according to set directions, are conventionally used guides or racks, compelling said support to be driven along rigid directions deriving from the combination in a plane of the Cartesian axes, and which constitute a limitation to a free displacement of the support.

SUMMARY OF THE INVENTION

The aim of the present invention is to solve the above mentioned problem, by providing a device for flatly displacing in all directions a support, with quick locking means, allowing the support to be displaced in all directions of its orbit, inside a region delimited, for example, by a set circle, and which is not affected by restraining guides and/or racks and which, accordingly, must not perform rigid displacements along Cartesian axes.

Within the scope of the above mentioned aim, a main object of the present invention is to provide such a displacement device, in which the support can be locked at a set position, in a very quick and safe manner, without the need of performing particular The document U.S. Pat. No. 4,437,730 discloses a device for flatly displacing in all direction a support, with quick locking means, substantially according to the preamble of claim 1.

The document DE-A-34 36 886 discloses a device for flatly displacing in all direction a support including a tie-rod with a cross member engaged in a recess defined in a pulling ring, the tie-rod being engageable with a ring nut rotatably driven from the outside of a casing. This device, as stated, includes a possible tie-rod but no locking ring housed inside a pulling ring and no further locking means. adjustment operations.

Another object of the present invention is to provide such a displacement device which can be specifically used in the photographic, cinematographic and television fields, in order to displace an optics assembly with respect to a body of a camera.

Yet another object of the present invention is to provide such a displacement device which is very reliable and safe in operation and which, moreover, is very competitive from a mere economic standpoint.

According to one aspect of the present invention, the above mentioned aim and objects, as well as yet other objects, which will become more apparent hereinafter, are achieved by a device for flatly displacing in all directions a support, with quick locking means, as claimed in claim 1.

BRIEF DESCRIPTION OF THE DRAWINGS

Further characteristics and advantages of the present invention will become more apparent hereinafter from the following detailed disclosure of a preferred, though not exclusive, embodiment of a device for flatly displacing in all directions a support, with quick locking means, which is illustrated, by way of an indicative, but not limitative, example, in the accompanying drawings, where:

FIG. 1 is a schematic exploded perspective view illustrating the displacement device according to the invention;

FIG. 2 is an exploded cross sectional view illustrating that same device;

FIG. 3 is a cross sectional view, taken along a diametrical plane, showing the subject device;

FIG. 5 is a further cross-sectional view, taken along a diametrical plane, of the subject device, this view clearly showing the displacement of the support;

FIG. 7 illustrates the locking driving element in a unlocked position thereof;

FIG. 8 is a cross-sectional view illustrating the locking driving element in a locking position thereof; and FIGS. 9 and 10 illustrate, respectively, the locking means in their unlocking and locking positions.

DESCRIPTION OF THE PREFERRED EMBODIMENT

Figure 4:
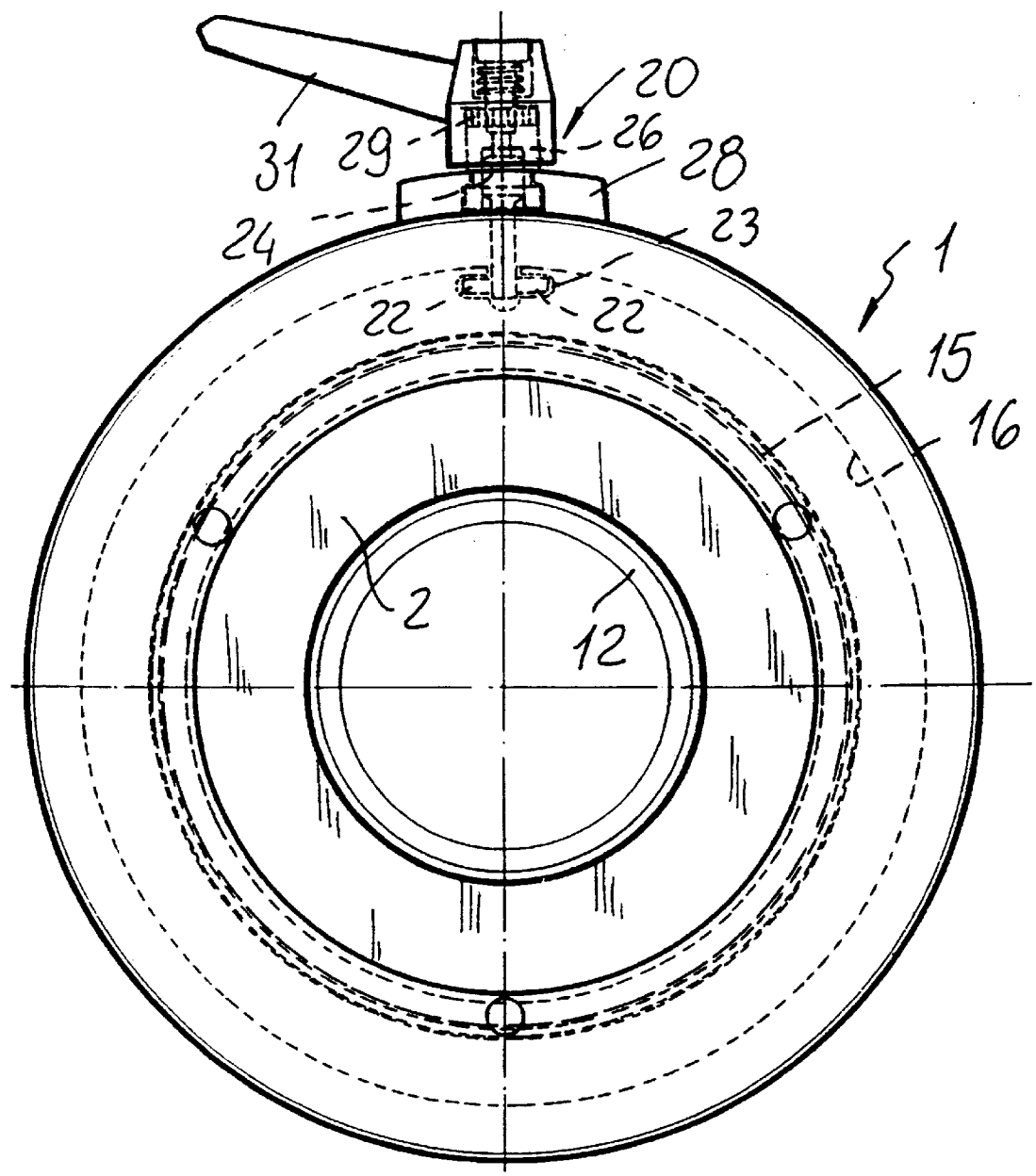
FIG. 4 is a top plan view showing the subject device.
Figure 6:
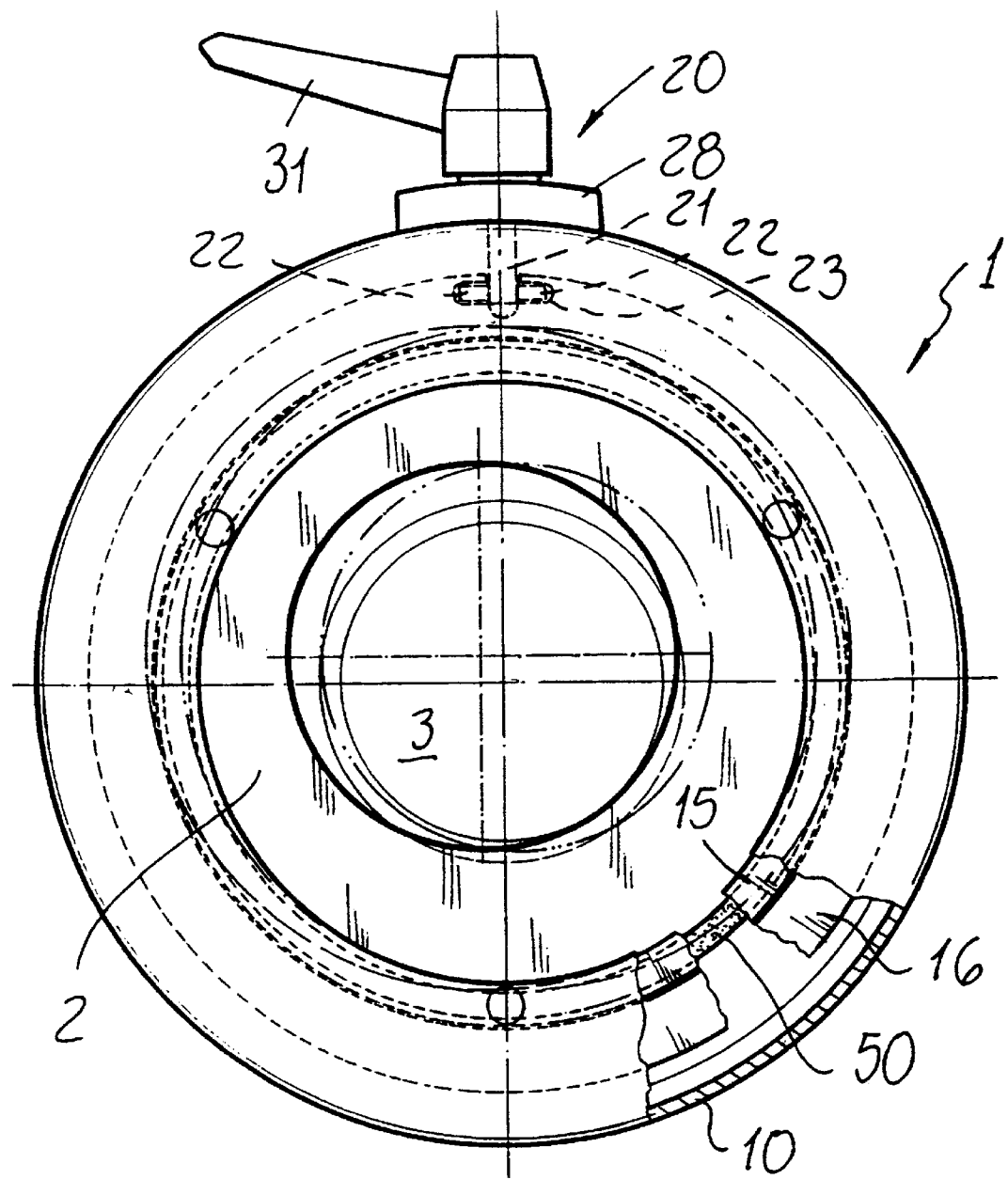
FIG. 6 is a top plan view of the subject device, this view clearly showing the displacement of the support.

With reference to the number references of the above mentioned figures, the device for flatly displacing in all directions a support, with quick locking means, according to the present invention, which has been generally indicated by the reference number 1, can be used in a lot of different applications.

In the following disclosure, will be disclosed an embodiment of the device which has been specifically designed for displacing photographic lenses, and this only by way of a not limitative example.

The device comprises a flat support 2 which, advantageously, includes a disc-like element having an opening 3, where are provided connecting means 4, for example threaded connecting means, for connecting a lens or objective.

Said flat support 2 is housed inside a casing, defining the displacement region of said flat support, and including an annular base 10, coupled to an annular cover 11, to which a clutch 12, for providing connection with a photocamera, is axially coupled.

On the flat support 2 is provided a locking body, including a locking ring element 15, arranged inside a pulling ring 16, which in turn is housed in said casing and coupled to said locking body, as generally indicated by the reference number 20. The latter is coupled to the casing.

The locking body is provided with a tie-rod 21, having cross-members 22 engaging in a recess 23, formed on the pulling ring, and with a threaded portion 24 rotatably coupled to a ring-nut 26 having an inner thread 27, and being rotatably supported by a base 28 applied on the peripheral portion of the base 10.

The ring nut 27 is provided with teeth 29 for engaging with corresponding teeth 30 of an operating lever 31 which, as it is actuated, will cause the ring nut 26 to turn and, accordingly, owing to the engagement with the thread 24, the translation of the tie-rod 21 and a translation in a diametrical direction of the pulling ring.

The latter holds in its inside the locking ring 15 and drives the locking means comprising small balls 40 arranged between the conically tapering bushes 41 and 42, respectively provided on the base 10 and on the locking ring 15, or any other suitable locking element.

The balls 40 or other like elements, in a unlocking condition, are housed in said conical tapered portions, whereas, as a pulley force is applied, then a pushing action operating between the base 10 and locking ring 15 will be provided, said locking ring being pushed against the flat support 2 which, accordingly, will be locked against the cover 11.

In this connection it should be pointed out that an anti-friction ring 50 is moreover provided, said anti-friction ring being associated with the locking ring 15, or any other suitable locking elements, on the face thereof turning the flat support 2, as well as a supporting ring 51 engaging on an abutment 52 defined by the cover 11, which will practically operate as a support for the locking assembly.

With the device in a unlocking position, the support body 2 can freely move along the orbit defined by the cover 11, the movement of said support body being not affected by retainment forces as due to guides or the like.

Upon having set a desired position for the flat support 2, it will be possible to simply lock it by operating the lever 31 which, by pulling the pulling ring 16, will cause the locking ring 15 to be displaced.

Thus, said locking ring, because of the coupling action due to the locking means formed by said small balls 40, will provide a pressing force against the flat support 2, thereby firmly locking said flat support in its desired position.

From the above disclosure it should be apparent that the invention fully achieves the intended aim and objects.

In particular, the fact is to be pointed out that a displacement device has been provided, which is very simple construction-wise and is very suitable for application in a photographic, cinematographic and television field, since the cover 11 can be provided with a clutch for coupling it to the camera, and the flat support 2 can be provided with an inside thread or clutch for a lens, which can be consequently easily offset from the optical axis, with the possibility of easily obtaining a free flat displacement in the region delimited by the cover 11.

The invention, as disclosed, is susceptible to several modifications and variations, all of which will come within the scope of the invention.

Moreover, all the constructional details can be replaced by other technically equivalent elements.

In practicing the invention, the used materials, as well as the contingent size and shapes, can be any, depending on requirements.

What is claimed is:

1. A device (1) having quick locating means for flatly displacing in all directions a support, said device comprising a flat support (2), housed in a casing which defines a displacement region of said flat support (2), said flat support (2) supporting a locking body, operatively associated with a locking driving element which is accessible from outside of said casing, said flat support comprising a disc-element having a central hole (3), surrounded by coupling means for coupling said disc element to an optics assembly, said casing comprising an annular base (10) which is adapted to be coupled to an annular cover (11), wherein said locking body comprises a lacking ring (15) housed inside a pulling ring (16) which is coupled to said locking driving element and said locking driving element comprises a tie-rod (21) having a cross member (22) which is adapted to engage a recess provided on said pulling ring (16), said tie-rod (21) having a threaded end portion (24) which is adapted to engage an inner thread (27) of ring-nut (26) and is rotatably supported by a bottom portion (28) coupled to a side surface of said base (10), said tie rod (21) being rotatably driven from the outside of said device, said ring-nut (26) being provided with outer teeth (29) which can, be firmly coupled with a lever (31) for rotating said ring-nut (25), to cause said pulling ring (16) and locking ring (15) to move in opposite directions, said device further comprising an additional locking means between said locking ring (15) and annular base (10) so that, as said locking ring (15) translates, a pressing farce is generated between said annular base (10) and locking ring (15) to press said lacking ring' against said flat support (2) and lock said flat support against said annular cover (7,1).

2. A device according to claim 1, wherein said additional locking means comprise a plurality of balls (40) arranged between conically tapering bushes (41, 42) provided on said annular base (10) and on said locking ring (15) so that as said locking ring (15) is displaced by said pulling zing (16), said pressing force is generated perpendicularly against said locking ring (15) to cause said locking zing (15) to abut against and lock said flat support (2).

3. A device according to claim 1, wherein said device comprises an antifriction ring (50), which abuts a face of said locking ring (15) which faces said flat support (2).

4. A device according to claim 1, wherein said device comprises a supporting ring (51), coupled to an abutment (52) of said cover (11) for support of said pulling ring (16).

* * * * *